United States Patent [19]

Kuhn

[11] Patent Number: 4,831,662

[45] Date of Patent: May 16, 1989

[54] FIBER OPTIC DATA TRANSMITTING SYSTEM

[75] Inventor: Loughrey R. Kuhn, Silver Spring, Md.

[73] Assignee: Optical Communications Corp., Silver Spring, Md.

[21] Appl. No.: 125,585

[22] Filed: Nov. 25, 1987

Related U.S. Application Data

[63] Continuation of Ser. No. 799,483, Nov. 19, 1985, abandoned, which is a continuation of Ser. No. 595,510, Dec. 9, 1983, Pat. No. 4,561,117, which is a continuation of Ser. No. 288,111, Jul. 29, 1981, Pat. No. 4,420,842.

[51] Int. Cl.$^4$ .............................................. H04B 9/00
[52] U.S. Cl. .................... 455/608; 455/617; 455/618; 370/3; 370/110.4
[58] Field of Search ....................... 455/608, 617, 618; 370/3, 110.4

[56] References Cited

U.S. PATENT DOCUMENTS 3,238,843  3/1966  Heller .................................. 350/356

FOREIGN PATENT DOCUMENTS 4900946  7/1987  European Pat. Off. .
52-69506  11/1977  Japan .

OTHER PUBLICATIONS

O. C. Jones "Methods of Modulating Light at Extreme Frequencies" Journal of Scientific Instruments, vol. 41, Nov. 1964.

J. P. Noblanc "Fiber Optical Communication Devices" Applied Physic vol. 43, No. 3, Jul. 1977.

*Primary Examiner*—Edward L. Coles, Sr.
*Attorney, Agent, or Firm*—Antonelli, Terry & Wands

[57] ABSTRACT

A fiber optic digital data transmitting system is disclosed which has the capability of transmitting and accurately reproducing digital data signals at the receiver even when the optical signal is attenuated in the fiber optic transmitting medium. A composite signal is produced at the transmitter which is the time coincident sum of the non-zero amplitude of the digital data signal to be transmitted and a time varying signal which encodes each non-zero amplitude of the digital signal and other information. The composite signal modulates an optical carrier signal which is coupled to a fiber optic transmission medium which couples the transmitter to the receiver. At the receiver, the presence of each time varying signal is detected as a non-zero amplitude of the digital signal. Circuitry is are provided in the receiver for producing a pulse in response to the detection of each time varying signal for reproducing the transmitted digital signal and for detecting any information in addition to the non-zero amplitude of the digital signal which has been encoded in the time varying signal. The present invention is compatible with existing PCM systems which utilize threshold detection.

10 Claims, 3 Drawing Sheets

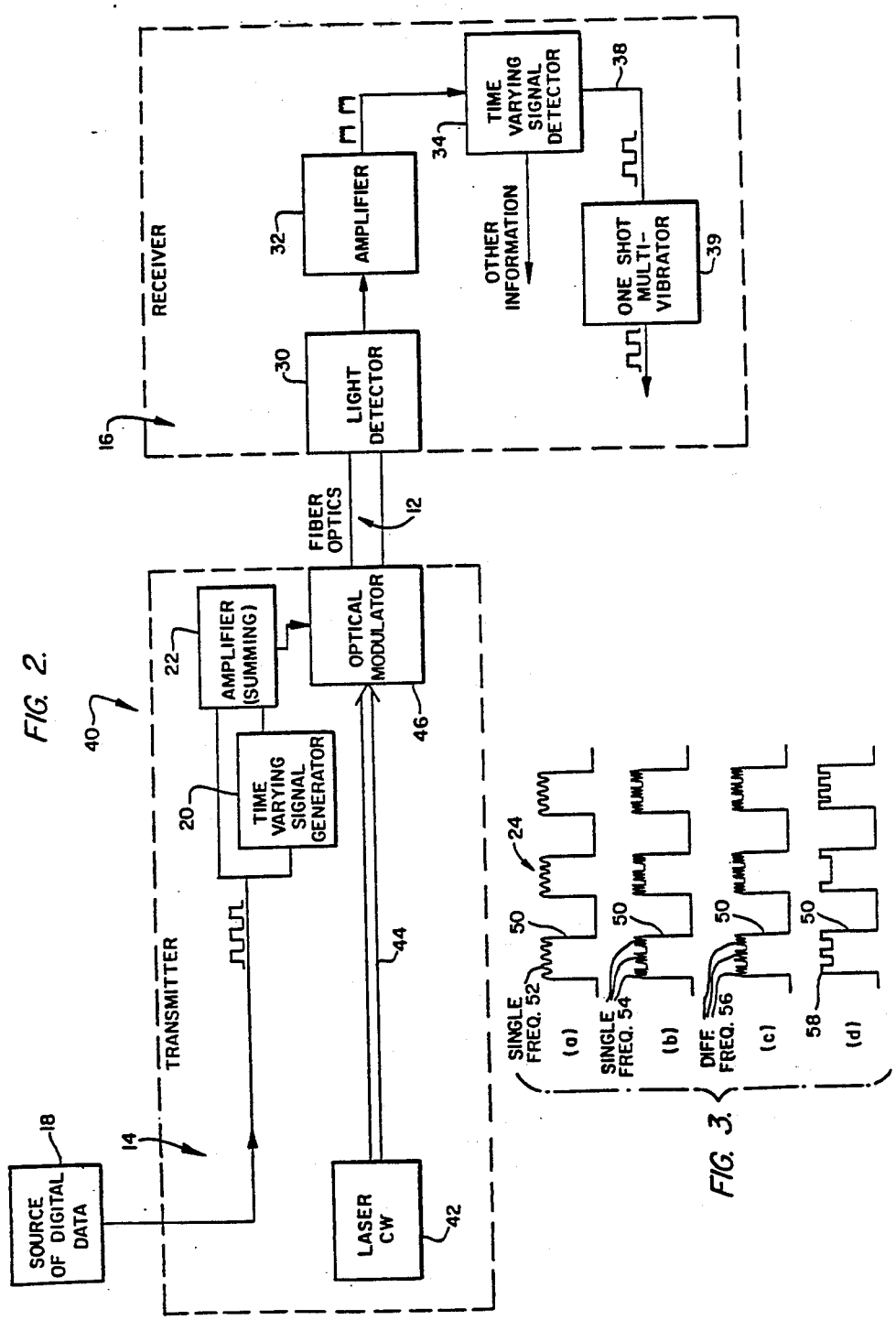

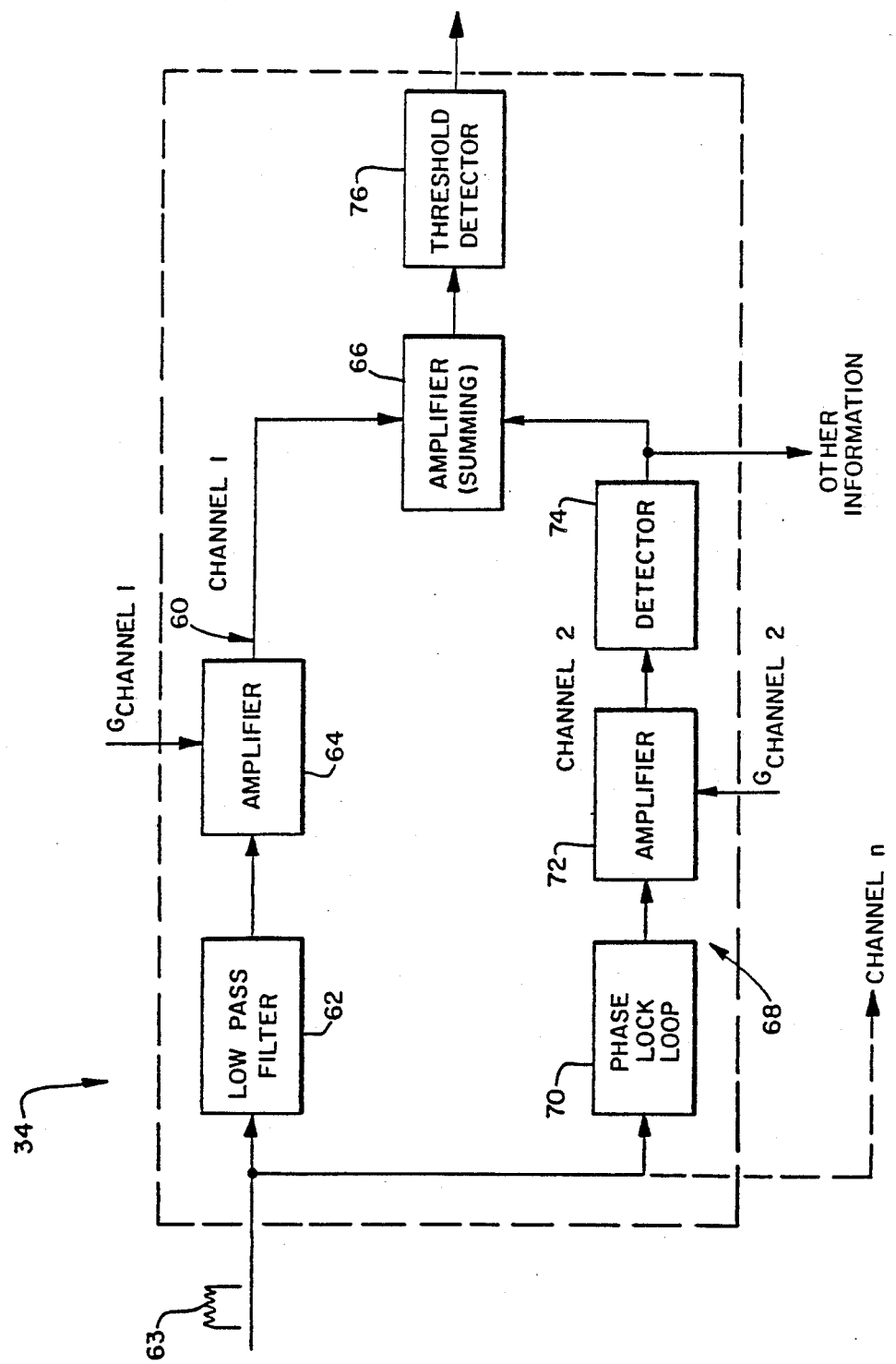

FIBER OPTIC DATA TRANSMITTING SYSTEM

CROSS REFERENCE TO RELATED APPLICATIONS

This application is a continuation of Ser. No. 799,483, filed Nov. 19, 1985, now abandoned, which is a continuation of Ser. No. 595,510, filed Dec. 9, 1983, entitled "Fiber Optic Digital Data Transmitting System", now U.S. Pat. No. 4,561,117, which is a Continuation of Ser. No. 288,111, filed July 29, 1981, entitled "Fiber Optic Digital Data Transmitting System," now U.S. Pat. No. 4,420,842.

BACKGROUND OF THE INVENTION

1. Field of the Invention

The invention relates to digital data transmission systems and to fiber optic digital data transmission systems.

2. Description of the Prior Art

Fiber optic digital transmission systems have been developed which have tremendous capacity to transmit large amounts of information over a single channel because of the large bandwidth which may be modulated upon an optical carrier signal. While the bandwidth of fiber optic transmission systems is a tremendous advantage in comparison to wire or radio frequency transmission mediums, digital fiber optic communication systems are nevertheless subject to problems caused by signal attenuation during transmission and noise.

The simplest form of detecting digital fiber optic communications is by using a threshold detector which senses every signal above a given threshold as a bit of information and every signal below the threshold as the absence of a bit. Threshold detectors are not able to reliably distinguish between high amplitude noise pulses and the transmitted digital data. Moreover, even though the optically encoded digital signal which is coupled to the fiber optic transmission medium from a transmitter or repeater may be relatively free from high amplitude noise, the fiber optic transmission medium may attenuate the digital signal sufficiently during transmission to drop the digital signal amplitude down close to or below the threshold level. For example, it is known that attenuations of the digital signal level in a fiber optic transmission medium of up to 20 dB or more may occur as a consequence of "poor[ quality splices which may be caused by a myriad of factors. To minimize digital signal attenuation in fiber optic transmission mediums, expensive connectors are used which require skilled labor to install. Moreover, expensive low noise threshold detectors are used to permit detection of attenuated digital signals. The difficulty in detecting attenuated digital signals transmitted by fiber optic transmission mediums requires the use of a larger number of repeaters to amplify the digital signal amplitude than otherwise would be required if threshold detectors could reliably detect low signal to noise ratio signals.

Current fiber optic communication systems use light emitting diodes which are operated at high power levels to produce a digital signal which has been modulated to a high amplitude. The operation of the light emitting diodes at high power levels can cause their premature failure. The operation of the light emitting diodes at high power levels is a consequence of the requirement that the amplitude level of the optical signal must be boosted to a sufficiently high level to permit accurate threshold detection and increased distance between repeaters.

In order to avoid the inherent unreliability of threshold detectors in accurately detecting the digital data which is being transmitted by a fiber optic transmission medium, sequenced voting devices have been used. In this approach, a digital signal is broken up into a number of slices, 16 for example, which are each "voted on" by single level or multilevel threshold detectors. If a certain number of threshold detectors affirm the presence of a digital signal, then a fixed digital signal is regenerated. The disadvantage of the sequenced voting devices has been their expense, and they are highly data-speed sensitive.

Satellite communications systems are extremely susceptible to problems caused by inaccurate detection of digital data at a transmitting station prior to transmission. Because of the approximate one-third of a second required to communicate between two ground stations via a relay from a geosynchronously orbiting satellite, any error in detecting a digital signal at a ground transmitting system, which is to be relayed to another ground station via satellite, after transmission will present the satellite communication system with a difficult error correction problem. To date, correction of detection errors which are discovered after transmission by a ground transmitting system have required the buffering of large amounts of data and sophisticated data processing because of the extremely high transmission bit rates which are characteristically used by current satellite multiplex communication systems. In the future when the number of ground stations, satellites and data rates are projected to dramatically increase for digital satellite communication systems, the requirement of accurately detecting digital data at ground stations prior to transmission will be even more acute because of the projected increase in information being transmitted. A data transmission system which economically detects and reduces the rate of transmission of erroneous data will lessen the amount of buffering and data processing equipment required to correct erroneous digital data transmission below that needed in current satellite systems. Since there is a tremendous advantage to communicating with ground stations via a fiber optic transmission medium because of bandwidth and cost considerations, a highly accurate detector for detecting fiber optically transmitted data at a ground station would be of great use in improving communication.

Currently, methods used to assist in error correcting are becoming progressively complex and expensive. One major network technique, time division multiplexing, allows separation of channels by an interval of time, but as data rates increase then not only are more accurate clocks necessary to determine accurate time intervals but accurate time synchronization between different points of a network can become overwhelmingly burdensome and failure prone. Another network technique that is tending to become burdensome in the existing prior art is the use of parity bits and/or address information bits that proceed or follow a stream/package of data bits. Parity bits in conjunction with protocol bits are now burdening data streams (especially when there may be hundreds of data initiating devices in a network) with overhead data that is mounting to 20% and even to 40% of the data being transmitted. All this overhead must be handled, rehandled and separated from the actual data.

Frequency shift keying is a known modulation technique for transmitting digital data which uses two discrete frequencies to encode the high and low levels of a digital signal. The signal format of frequency shift keying does not transmit a fixed amplitude component representative of the high level bit position and additional information such as the present invention. Systems using frequency shift keying are not compatible with existing digital data transmitting systems which detect PCM by threshold detection.

SUMMARY OF THE INVENTION

The present invention is a digital communication system which in its preferred embodiment is a digital fiber optic communication system. The fiber optic communication system of the present invention has the capability of transmitting and accurately detecting the digital data signal at a receiver even when the optical signal is attenuated during transmission. The capability of the present invention to accurately detect digitally transmitted data at the receiver reduces the need for high cost splicings in the fiber optic transmission medium which require time and skilled labor to implement, "low" noise detectors and close spacing between repeaters to insure that the signal level is not attenuated below a level at which accurate detection can be made.

In accordance with the invention a composite signal is produced at the transmitter which is the time coincident sum of the non-zero amplitudes of the digital data signal to be transmitted and a time varying signal which encodes at least each non-zero amplitude of the digital signal. The composite signal modulates an optical carrier signal which is coupled to a fiber optic transmission medium. The time varying signal may be but is not limited to a single burst of constant frequency alternating current. The time varying signal may be of any known analog or digital encoding format in view of the great bandwidth available in a fiber optic communications system.

The receiver is designed to respond to the frequency or frequencies of the time varying signal which are contained within the modulated optical carrier wave. At the receiver, the detection of each time varying signal indicates the reception of a non-zero amplitude of the digital signal. Means are provided in the receiver for producing a pulse in response to the detection of each time varying signal for reproducing the transmitted digital signal and for detecting any information in addition to the presence of a non-zero amplitude which is encoded in the time varying signal.

The transmission of the time varying signal in time coincidence with the non-zero amplitudes of the digital signal has advantages. By designing the receiver to respond to a narrow frequency range surrounding the fundamental frequency or frequencies of the time varying signal, the ability to detect low amplitude digital signals may be improved over that possible with threshold detectors. In addition, the detection of the fundamental frequency or frequencies of the time varying signal may be implemented by using conventional electronic components without requiring data processing. The present invention is compatible with existing fiber optic digital transmission systems which are not designed to respond to the time varying component of the composite signal. Conventional threshold or "voting" devices may be used to detect the digital part of the composite signal without any interference from the time varying component which may be ignored.

In view of the tremendously wide bandwidth which is present in fiber optic digital communication systems, the time varying signal component of the composite signal may be used to transmit large amounts of additional information which could be used to communicate information to the receiver which facilitates error detection, the identification of the transmitter, or establishes a priority of communication between different parts of the system in accordance with known multi-station data communication techniques. It should be understood that there is no limitation to the type of information which may be transmitted in the time varying signal component of the composite signal.

The following are definitions of terms used throughout the specification. A composite signal is the sum of the non-zero amplitudes of the digital signal to be transmitted and a time varying signal which is any signal which changes amplitude over the time interval that a non-zero amplitude of the digital signal is present. Time coincident defines a time interval during which non-zero amplitudes of the digital signal and the time varying signal are simultaneously present. The time varying signal may periodically drop to zero amplitude during each non-zero amplitude of the digital signal and be described as time coincident. Optical carrier signal is any bandwidth of electromagnetic radiation which may be transmitted by an optic transmission medium. Optical transmission medium is any guided or unguided physical medium for conveying an optical carrier signal including fiber optics, integrated optics and atmospheric and space medium.

BRIEF DESCRIPTION OF THE DRAWINGS

FIG. 2 illustrates a second embodiment of a fiber optic digital communication system in accordance with the present invention which uses a laser as a continuous wave source of an optical carrier signal with externally modulated continuous wave beams;

FIG. 3 illustrates examples of the composite signal which may be used with the present invention; and FIG. 4 illustrates a time varying signal detector which may be used to detect the transmitted composite signal.

DESCRIPTION OF THE PREFERRED EMBODIMENTS

Figure 1:
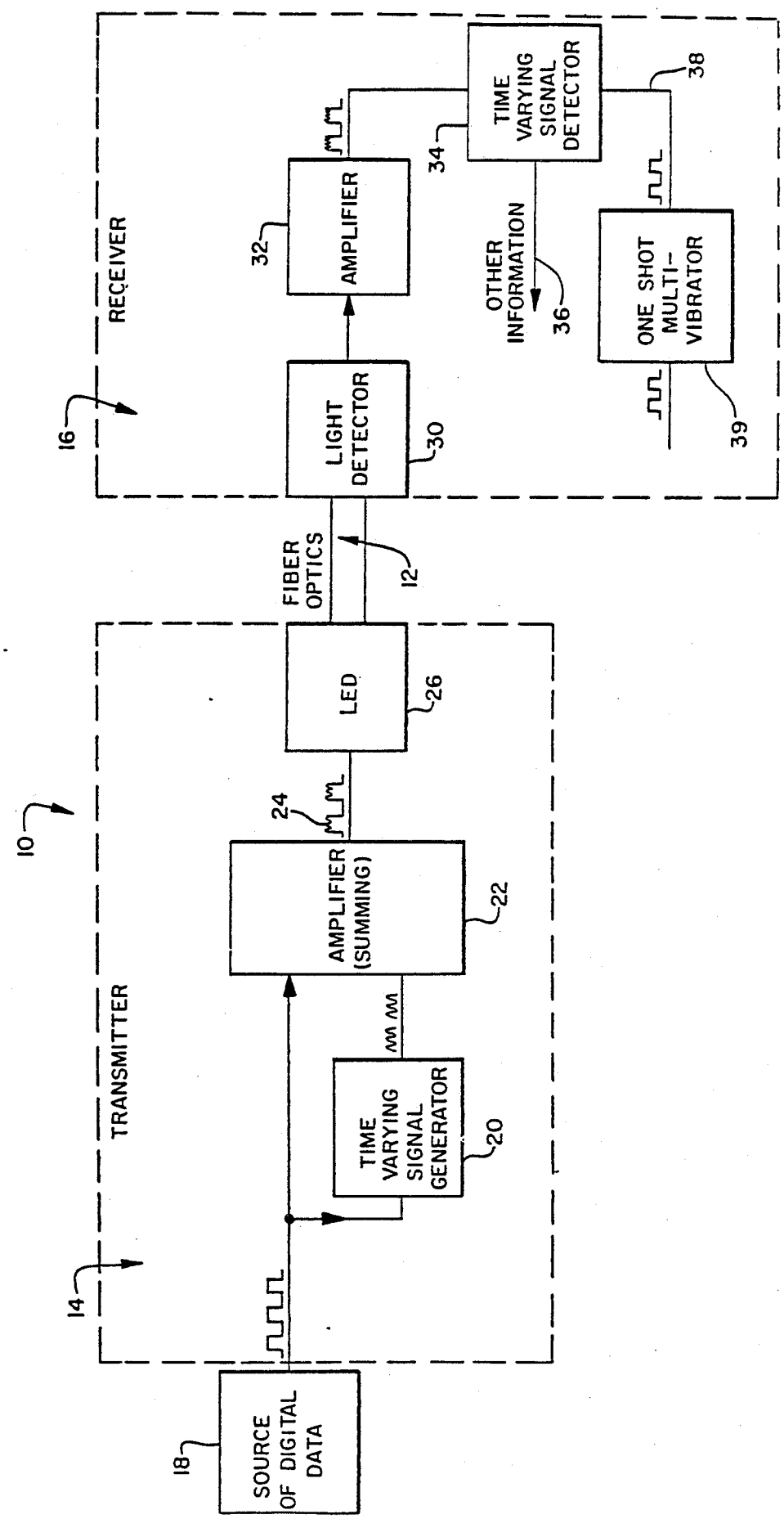
FIG. 1 illustrates a first embodiment of a fiber optic digital communication system in accordance with the present invention which uses a light emitting diode as an internally modulated source of optical carrier signal.

FIG. 1 illustrates a first embodiment 10 of the present invention which uses an optical carrier wave emitted by a light emitting diode to transmit digital data on a fiber optic transmission medium 12 between a transmitter 14 and a receiver 16.

A transmitter in accordance with the first embodiment is adapted to be coupled to a source of digital data 18 which is to be transmitted. The source of data may be a computer or any other source which produces binary data having a zero amplitude level and a non-zero amplitude level to encode two signal states in accordance with conventional encoding techniques. The source of digital data is coupled to a time varying signal generator 20 which in this embodiment produces a burst of oscillations of a duration no longer than the non-zero amplitude of the individual data bits which are coupled to the time varying signal generator. The frequency of oscillation of the time varying signal generator is chosen to be sufficiently high that several cycles of oscillation will be completed during the period of time coincidence between each non-zero amplitude of the digital signal and the time varying signal which is used to encode at least the presence of a non-zero amplitude of the digital signal. The output of the time varying signal generator 20 is coupled to an amplifier 22 which sums the keyed oscillations produced by the time varying signal generator with the non-zero amplitudes of the digital data signal. The level of the composite signal at all points in time is preferably chosen to be above the threshold level of detection of existing PCM detection systems. The output composite signal 24 of the amplifier is coupled to light emitting diode 26 which produces an optical carrier signal which has been modulated in intensity in accordance with the composite signal. The modulated optical carrier is coupled to a fiber optic transmission medium 12 which couples the transmitter 14 to the receiver 16. It should be understood that each of the elements used in the transmitter is of conventional design.

The receiver 16 functions to detect the modulated optical carrier wave which is transmitted by the fiber optic transmission medium 12. The detection of the modulated optical carrier receiver includes a light detector 30 which may be p.i.n photo-detector, photo-transistor, avalanche photo-diode, avalanche reach-through, photo-diode, photo-multiplier tube, or any other device which produces an output voltage in response to variations in the intensity of the modulated optical carrier wave. The output signal from the light detector 30 is coupled to an amplifier 32 which has a linear amplification characteristic for producing an output signal of sufficient gain to permit detection of the time varying signal component of the composite signal. The output of the amplifier 32 is coupled to a time varying signal detector 34 which functions as a phase lock loop. The time varying signal detector 34 may be a Signetics NE 560 chip which will respond to tones varying in frequency from approximately 1 HZ to 15M Hz of an EXAR S 200 which responds to frequencies up to 30M Hz. The time varying signal detector 34 resonates in response to the fundamental frequency or frequencies of the tones produced by the time varying signal generator 20. The time varying signal detector 34 has two outputs, the first 36 being for information other than the detected digital signal and the second 38 being a pulse train corresponding to the transmitted digital data. The second output 38 is coupled to a pulse forming circuit 39 such as a one shot multivibrator which converts the output of the time varying signal generator into a series of pulses having a fast rise time. The one shot multivibrator may be a Texas Instruments LS 221. The pulses from pulse forming circuit 39 may be processed by data processing equipment, etc. Detection of a received bit may be enhanced even though the overall amplitude of the composite signal has been attenuated to a level to make threshold detection difficult. Significant enhancement of detection would occur where the noise distribution decreases, typically at higher frequencies than the data rate. In addition, the time varying signal generator 20 may contain other conventional detection circuitry which is designed to respond to any format of encoding used at the transmitter by the time varying signal generator 20. Information contained within the time varying component of the composite signal could be used for identification of the transmitter, error checking or establishing the priority of the transmitter in the overall communication system, etc.

FIG. 2 illustrates a second embodiment 40 of the present invention. Like parts in FIGS. 1 and 2 are identified by identical reference numerals. The receivers 16 of FIGS. 1 and 2 are identical. A continuous wave laser 42 is used as the source of the optical carrier wave. The output beam of light 44, which is produced by laser 42, is imaged upon an optical modulator 44 which preferably is a STARK, POCKELS or BRAGG cell but is not limited thereto. The optical modular 46 produces an output beam of light which is imaged upon the fiber optic transmission medium 12 to transmit the composite optical signal which is produced by the source of digital data 18, time varying signal generator 20 and summing amplifier 22 in the identical manner described in conjunction with FIG. 1 supra. The output of the summing amplifier 22 is coupled to the optical modulator 44 to modulate the optical carrier wave produced by laser 40 in accordance with the composite output signal produced by summing amplifier 22.

The present invention is not limited to the type of additional information which is transmitted in the time varying signal nor the type of time varying signal that is used. For example, while the embodiments of FIGS. 1 and 2 use a single frequency tone to encode the presence of a non-zero amplitude in the digital signal without conveying additional information, the frequency of the tone in FIGS. 1 and 2 could also encode the identity of the transmitter by assigning a unique frequency to each transmitter. The time varying signal generator 20 which is used to encode any additional information could be any analog or digital signal generator which is activated in response to the presence of each non-zero amplitude in the digital signal which is to be transmitted. Specifically, but not limited thereto, the time varying signal may be a digital signal of any known format, a single frequency burst present throughout the duration of each non-zero level of the digital signal, a series of single frequency bursts which are separated by zero amplitude intervals during the duration of each non-zero amplitude level of the digital signal to be transmitted, a series of bursts of different frequency which are separated by zero amplitude intervals during the duration of each non-zero amplitude level of the digital signal to be transmitted. If the time varying component contains digital information, the time varying signal detector 34 may be programmed to recognize certain patterns of digital information which can be discriminated even when the composite signal is attenuated. The nature of the time varying signal which is generated at the transmitter 14 dictates the design of the time varying signal detector of the receiver 16. For each type of time varying signal generator 20 at the transmitter 14 there will be a corresponding time varying signal detector 34 at the receiver 14 which is designed to detect the digital data and all other information which is encoded in the time varying signal.

FIGS. 3a, 3b, 3c, and 3d illustrate examples of composite signal formats which may be used with the present invention. FIG. 3(a) illustrates a composite signal 24 having a high level component 50 representative of a high level bit and a single frequency sinusoidal tone 52 which is present for the entire duration of the high level signal. The frequency of the tone 52 may be chosen to encode information. FIG. 3(b) illustrates a composite signal 24 having a high level component 50 and a plurality of single frequency sinusoidal tones 54. The number and pattern of the tones 54 are used to encode additional information. FIG. 3(c) illustrates a composite signal 24 having a high level component 50 and a plurality of tones 56, each having a different frequency. The tones 56 are used to encode additional information. The composite signal 24 represented by FIGS. 3(a), 3(b), and 3(c) may be generated by standard frequency synthesis. The time varying signal generator 20 may use a programmed EXAR S 200 chip which in conjunction with 74 LS293 counters may be programmed to produce frequencies up to 30 MHZ. FIG. 3(d) illustrates a composite signal having a high level component 50 and a PCM signal 58. The PCM signal 58 is used to transmit additional information. The composite signal 24 represented by FIG. 3(d) may be generated by the time varying signal generator 20 which may be produced by squaring the output from the frequency synthesizer described for producing the modulation of FIG. 3(c).

FIG. 4 illustrates a time varying signal detector 34 which may be used in the embodiments of FIGS. 1 and 2. The input signal 63 to FIG. 4 is produced by the amplifier 32 of FIGS. 1 and 2. The input signal 63 is applied to a first channel 60 which has a gain which is chosen in accordance with a gain characteristic described infra. The output of the amplifier 64 is applied to a summing amplifier 66. The input signal is also applied to a second channel 68 which includes a phase lock loop 70 which is designed to resonate in response to the fundamental frequency of the time varying signal of FIG. 3(a). The output of the phase lock loop 70 is applied to an amplifier 72 having a gain chosen in accordance with the gain characteristic described infra. The output of amplifier 72 is applied to a detector 74 which rectifies the output of the phase lock loop to produce a DC level signal which is applied to the summing amplifier 66. The output of the summing amplifier 66 is applied to a threshold detector 76, which has a Schmitt trigger, produces a signal which is applied to the one shot multivibrator 39 of FIGS. 1 and 2. The time varying signal generator will have n−1 additional channels where n is the number of different frequency tones which are used in the composite signals 24 of FIG. 3(c). Each additional channel is of identical design to channel 2 except that the phase lock loop 70 of each additional channel is designed to respond to a different tone of the frequencies present in the signal of FIG. 3(c).

The ratio of the gains of the amplifiers 64 and 72 is chosen in accordance with the following relationship:

$$\frac{G_{amp\ 64}}{G_{amp\ 72}} = \frac{mN_{channel\ 2}}{N_{channel\ 1}}$$

wherein m is the modulation depth of the time varying signal with respect to the amplitude of non-zero level and N is the noise level of the appropriate channels. When the gains of the respective channels are chosen in accordance with the foregoing ratio, the probability of detection error is reduced. When more than one frequency is used in the time varying signal, the gain of the additional channels may be chosen in accordance with the foregoing relationship with the substitution of the appropriate quantities for each additional channel.

The signal of FIG. 3(d) may be detected by a time varying signal detector 34 which is a digital computer that has been programmed in a standard way to detect a bit stream, which detection is initiated by the leading edge of the PCM signal.

ADDITIONAL EMBODIMENTS

While the preferred embodiments of the present invention are fiber optic digital communication systems, the invention may be used in non-optical fiber optic communication mediums such as microwave. To use a microwave communication medium, a source of microwaves and a suitable modulator must be provided at the transmitter and at the receiver a suitable detector of microwaves and a detector of the time varying signal must be provided.

The present invention is not limited to any particular form of modulating the optical carrier wave. Thus while the optical modulators of the embodiments of FIGS. 1 and 2 use intensity modulation, other forms of modulation could be used such as polarizing the optical carrier signal in accordance with the variation of the composite signal without departing from the spirit of the invention.

The invention is not limited to the transmission of any particular format of digital data.

While the preferred form of the optical transmission medium that has been discussed in the embodiments of FIGS. 1 and 2 is fiber optics, it should be understood that the invention may use other optical transmission mediums.

I claim:

1. A transmitter for use in a digital data transmitting system having a transmitter, an optical transmission medium and a receiver comprising:
   (a) means for producing a time varying signal which is time coincident with the non-zero amplitude levels of a digital signal having zero and non-zero amplitudes, the time varying signal being used to encode the occurence of the non-zero digital amplitudes of the digital signal;
   (b) means for combining two input signals into a time coincident composite output signal, the first input signal being from a source of a digital signal which is to be transmitted, and the second input signal being from the means for producing the time varying signal; and
   (c) means coupled to the means for combining for producing an optical signal varying in amplitude in accordance with the composite signal.

2. A transmitter for uase in a digital data transmitting system having a transmitter, an optical transmission medium and a receiver comprising:
   (a) means for producing a time varying signal which is time coincident with non-zero amplitude levels of a digital signal having zero and non-zero levels, the time varying signal being used to encode the occurence of the non-zero digital amplitudes of the digital signal;
   (b) means for combining two input signals into a composite output signal, the first input signal being from a source of a digital signal which is to be transmitted and the second input being coupled to the means for producing the time varying signal;
   (c) means for producing a beam of an optical carrier signal which is adapted to be coupled to the optical transmission medium used for transmitting the digital signal; and
   (d) means disposed within the beam which is responsive to the means for combining for modulating the beam with the composite signal.

3. A transmitter in accordance with claim 2 wherein the means for modulating is an intensity modulator.

4. A transmitter in accordance with claim 3 wherein the intensity modulator is a STARK cell.

5. A transmitter in accordance with claim 2 wherein the modulator varies the polarization of the coherent electromagnetic energy in accordance with the amplitude of the composite signal.

6. A transmitter in accordance with claim 2 wherein the means for producing a beam of light is a continuous wave laser.

7. A transmitter for use in a digital data transmitting system having a transmitter, a transmission medium and a receiver comprising:
(a) means for producing a time varying signal which is time coincident with non-zero amplitude levels of a digital signal having zero and non-zero levels, the time varying signal being used to encode the occurrence of the non-zero digital amplitudes of the digital signal;
(b) means for combining two input signals into a time coincident composite output signal, the first input signal being from a source of a digital signal and the second input being coupled to the means for producing the time varying signal; and
(c) means coupled to the means for combining for modulating a carrier signal in accordance with the composite signal.

8. A digital data transmitting system comprising:
(a) means for producing a time varying signal which is time coincident with non-zero amplitude levels of a digital signal having zero and non-zero amplitude levels, the time varying signal being used to encode the occurrence of the non-zero digital amplitudes of the digital signal;
(b) means for combining two input signals into a time coincident composite output signal, the first input signal being from a source of a digital signal and the second input being coupled to the means for producing the time varying signal;
(c) means coupled to the means for combining for producing a modulated optical carrier signal varying in amplitude in accordance with the composite signal;
(d) an optical transmission medium having an input and an output, the input being coupled to the means for producing a modulated optical carrier signal;
(e) means for detecting the modulated optical signal to produce a time varying signal which varies in accordance with the composite signal, the means for detecting being coupled to the output of the optical transmission medium; and
(f) means for detecting the time varying signal, the detection of the time varying signal indicating reception of a digital signal of non-zero amplitude.

9. A digital data transmitting system comprising:
(a) means for producing a time varying signal which is time coincident with non-zero amplitude levels of a digital signal having zero and non-zero levels, the time varying signal being used to encode the occurrence of the non-zero digital amplitudes of the digital signal;
(b) means for combining two input signals into a time coincident composite output signal, the first input signal being from a source of a digital signal and the second input signal being coupled to the means for producing the time varying signal;
(c) means for producing a beam of an optical carrier signal which is used for transmitting the digital signal;
(d) means disposed within the beam which is responsive to the means for combining for modulating the beam of coherent electromagnetic energy with the composite signal;
(e) an optical transmission medium having an input and an output, the input being coupled to the means for producing a modulated optical carrier signal;
(f) means for detecting the modulated optical carrier signal to produce a time varying signal which varies in accordance with the composite signal, the means for detecting being coupled to the output of the optical transmission medium; and
(g) means for detecting the time varying signal, the detection of the time varying signal indicating the reception of a digital signal of a non-zero amplitude.

10. A receiver for use in a digital data transmission system having a transmitter, an optical transmission medium and a receiver comprising:
(a) means for detecting a composite signal which has been modulated upon a received optical carrier signal, the composite signal comprising a time coincident non-zero amplitude digital signal and a time varying signal which encodes the non-zero digital amplitude of the digital signal; and
(b) means for producing a pulse in response to the detection of each time varying signal.

* * * * *